United States Patent
Ueda et al.

(10) Patent No.: US 8,420,159 B2
(45) Date of Patent: Apr. 16, 2013

(54) METHOD OF FABRICATING MAGNETIC HEAD SLIDER INCLUDING PARTIAL REMOVAL STEP OF PROTECTING FILM

(75) Inventors: Kunihiro Ueda, Hong Kong (CN); Hong Xin Fang, Hong Kong (CN); Dong Wong, Hong Kong (CN)

(73) Assignee: SAE Magnetics (H.K.) Ltd., Hong Kong (CN)

( * ) Notice: Subject to any disclaimer, the term of this patent is extended or adjusted under 35 U.S.C. 154(b) by 158 days.

(21) Appl. No.: 12/588,911

(22) Filed: Nov. 2, 2009

(65) Prior Publication Data
US 2010/0291294 A1    Nov. 18, 2010

(30) Foreign Application Priority Data

May 15, 2009   (CN) .......................... 2009 1 0145687
Jul. 13, 2009   (JP) ................................ 2009-164430

(51) Int. Cl.
*G11B 20/00* (2006.01)
(52) U.S. Cl.
USPC .......................................... 427/127; 427/130
(58) Field of Classification Search .................. 427/127
See application file for complete search history.

(56) References Cited

U.S. PATENT DOCUMENTS 6,091,581 A * 7/2000 Gray et al. ............... 360/125.35
6,503,406 B1 * 1/2003 Hsiao et al. .................... 216/22

FOREIGN PATENT DOCUMENTS

JP        2007-26506        2/2007

* cited by examiner

*Primary Examiner* — Timothy Meeks
*Assistant Examiner* — Mandy Louie
(74) *Attorney, Agent, or Firm* — Nixon & Vanderhye PC (57) ABSTRACT

The method of fabricating a magnetic head slider includes steps of: forming a first protective film on an air bearing surface of a magnetic head slider on which either a recording element or a reproduction element is formed or on which both a recording element and a reproduction element are formed; removing a portion of the first protective film to reduce the thickness of the first protective film and forming a second protective film over the first protective film that has been reduced in thickness; and forming an uneven portion for controlling the flying characteristics of the magnetic head slider on the air bearing surface of the magnetic head slider; wherein the formation of the uneven portion is carried out after the first protective film has been formed and before the second protective film is formed, or after the second protective film has been formed.

3 Claims, 5 Drawing Sheets

METHOD OF FABRICATING MAGNETIC HEAD SLIDER INCLUDING PARTIAL REMOVAL STEP OF PROTECTING FILM

The present application is based on, and claims priority from, China Application No. 200910145687.7, filed on May 15, 2009 and JP Application No. 2009-164430, filed on Jul. 13, 2009, the disclosure of which is hereby incorporated by reference herein in its entirety.

BACKGROUND OF THE INVENTION

1. Field of the Invention

The present invention relates to a method of fabricating a magnetic head slider, and more particularly relates to a method of forming a protective film on an air bearing surface.

2. Description of the Related Art

In a hard disk device, a magnetic head slider (hereinbelow referred to as a "slider") flies over the recording medium (hard disk or magnetic disk) with only a slight gap interposed to read data from the recording medium and to write data to the recording medium.

The magnetic head for reading data from the recording medium and writing data to the recording medium must be protected from corrosion in a wide variety of environments and must be protected from collision with the recording medium. Therefore, a protective film composed of, for example, diamond-like-carbon (DLC) is formed on the surface of the slider that faces the recording medium, i.e., the air bearing surface.

However, the development of recording media with higher recording densities in recent years has been accompanied by a need for a reduction of the gap between the slider and the recording medium. To be more accurate, this requirement means a decrease of the spacing between the recording medium and the reproduction element and the spacing between the recording medium and the recording element. Decreasing the film thickness of the protective film is effective for this purpose. However, because the protective film is formed on the surface of the slider in which unevenness occurs, the film thickness tends to be easily influenced by unevenness. In places where the film thickness is reduced, pinholes tend to occur in the protective film, and these pinholes serve as the origin of corrosion of the underlying reproduction element and recording element. Accordingly, merely reducing the film thickness of the protective film to reduce the spacing between the slider and recording medium is problematic.

In view of this problem, JP-A-2007-026506 discloses a method of forming a protective film of a slider. According to this method, a silicon (Si) film and a DLC film are deposited in that order on the air bearing surface of the slider. Processing of the air bearing surface is next carried out in this state, following which the silicon film and DLC film are entirely removed. The processing of the air bearing surface involves forming on the air bearing surface an uneven portion that controls the air flow that enters the space between the slider and recording medium when the recording medium is being driven and that thereby controls the flying characteristic of the slider. A protective film is then formed again and an ion beam is irradiated from an oblique angle to remove a portion of the protective film.

However, a protective film with superior corrosion resistivity properties still cannot be formed even when this type of method is used. This problem is presumed to arise because, even when etching of only the silicon film and DLC film is intended, etching damage inevitably remains on the underlying recording element and reproduction element and affects the reliability of the elements. In particular, increasing the thickness of the protective film to raise the corrosion resistivity property is precluded by the demand for reduction of the spacing between the recording medium and the recording element and the spacing between the recording medium and the reproduction element for the future development of even higher recording densities.

SUMMARY OF THE INVENTION

It is an object of the present invention to provide a method of fabricating a magnetic head slider that allows the formation of a protective film that provides a superior corrosion resistivity property while limiting film thickness.

According to the present invention, the method of fabricating a magnetic head slider includes steps of: forming a first protective film on an air bearing surface of a magnetic head slider on which either a recording element or a reproduction element is formed or on which both a recording element and a reproduction element are formed; removing a portion of the first protective film to reduce the thickness of the first protective film and forming a second protective film over the first protective film that has been reduced in thickness; and forming an uneven portion for controlling the flying characteristics of the magnetic head slider on the air bearing surface of the magnetic head slider; wherein the formation of the uneven portion is carried out after the first protective film has been formed and before the second protective film is formed, or after the second protective film has been formed.

The first and second protective films are formed for protecting the recording element and the reproduction element. These protective films are preferably made as flat as possible to prevent the occurrence of pinholes. The inventors of the present invention discovered that the first protective film and second protective film are preferably formed in separate processes, and further, that the thickness of the first protective film is preferably reduced before forming the second protective film. Specifically, at the time of formation of the first protective film, the surface of the first protective film is influenced by the minute unevenness of the air bearing surface and minute unevenness therefore occurs, whereby a flat protective film is difficult to form despite the formation of the second protective film over this surface. In contrast, when the thickness of the first protective film is reduced, the reduction of thickness preferentially occurs at portions that relatively protrude, i.e., at portions in which the film thickness is great or at portions in which the first protective film was formed on points at which the air bearing surface protrudes, and as a result, the surface of the first protective film is flatter. Forming the second protective film in this state enables further improvement of the flatness characteristic of the surface of the second protective film and can suppress the occurrence of pinholes. On the other hand, completely removing the first protective film raises the potential for causing damage to a recording element or reproduction element. Reducing the thickness of the first protective film means that a portion of the first protective film is left and has the effect of not only making the second protective film flatter but of also mitigating damage to the recording element and reproduction element. In addition, because a portion of the first protective film is removed once, an increase in the film thickness of the final protective film can be easily suppressed. These effects combine to enable the formation of a protective film having a superior corrosion resistivity property while limiting film thickness.

In the actual process, the uneven portion is formed before the second protective film is formed or after the second protective film has been formed. In the former case, the first protective film is damaged by the formation step of the uneven portion, but portions that are close to the surface of the damaged first protective film are removed by the implementation of the thinning process. The possibility of damage reaching the recording element and reproduction element during removal is reduced because not all of the first protective film is removed and a portion is left. Of the first protective film, portions that were damaged have been removed, and moreover, the flatness of the portions that remains is improved, and as a result, the new formation of the second protective film enables the formation of a highly reliable protective film. In the latter case as well, the flatness of the surface of the second protective film is improved because the second protective film is formed after the flatness of the first protective film has been improved by the thinning process. As a result, the flatness of the protective film can be maintained despite the subsequent formation of an uneven portion, and the occurrence of pinholes can be prevented.

The present invention can thus provide a method of fabricating a magnetic head slider that allows the formation of a protective film having a superior corrosive resistivity property while limiting film thickness.

The above and other objects, features and advantages of the present invention will become apparent from the following description with reference to the accompanying drawings which illustrate examples of the present invention.

DETAILED DESCRIPTION OF THE PREFERRED EMBODIMENTS

Figure 1:
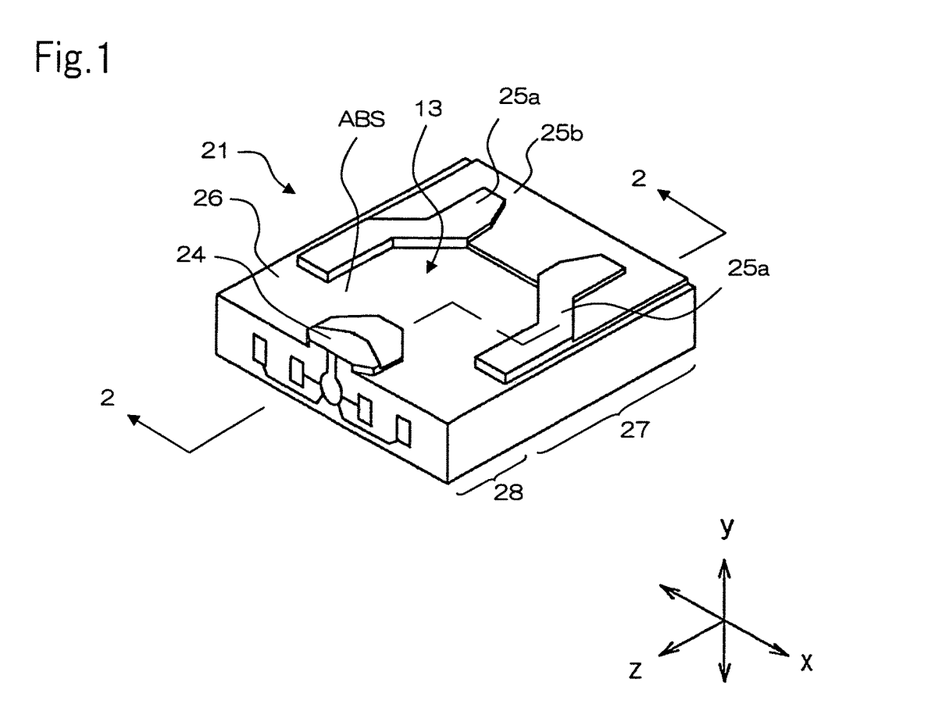
FIG. 1 is a perspective view of a slider relating to the first embodiment of the present invention.

Explanation first regards the slider that is the object of the present invention with reference to the drawings. FIG. 1 is a perspective view showing an example of a slider that is fabricated using the present invention. A disk-shaped recording medium (not shown) that is rotationally driven is positioned above slider 21 in the upper portion of the drawing. Slider 21 includes substrate 27 and thin-film magnetic head 28. Slider 21 forms a substantially parallelepiped shape, one of the six surfaces facing the recording medium. This surface is referred to as air bearing surface ABS. Uneven portion 13 (floating surface) for controlling the flying characteristics of slider 21 is formed on air bearing surface ABS of slider 21, the protruding parts being composed of read/write unit 24, which is provided with reproduction element 11 and recording element 12 (see FIG. 2) of thin-film magnetic head 28, and rail parts 25a and 25b that have steps, the other portions being recessed portion 26.

When the recording medium rotates, the air flow that passes between the recording medium and slider 21 produces lift in the downward y-direction in slider 21. Slider 21 flies from the surface of the recording medium due to this lift. The x-direction is the transverse direction of tracks of the recording medium, and the z-direction is the circumferential direction of the recording medium. Rail parts 25a are as a whole formed along the z-direction, and thin-film magnetic head 28 is formed on the air flow outlet side (the lower left end in the figure) of slider 21. Air enters from the slight gap between rail part 25b and the recording medium, flows against read/write unit 24 while being rectified by rail parts 25a on both sides and exits from the gap between read/write unit 24 and the recording medium, whereby slider 21 flies from the surface of the recording medium. In this way, slider 21 is able to fly with respect to the recording medium due to uneven portion 13 of air bearing surface ABS when thin-film magnetic head 28 is performing reading from or writing to the recording medium.

Figure 2:
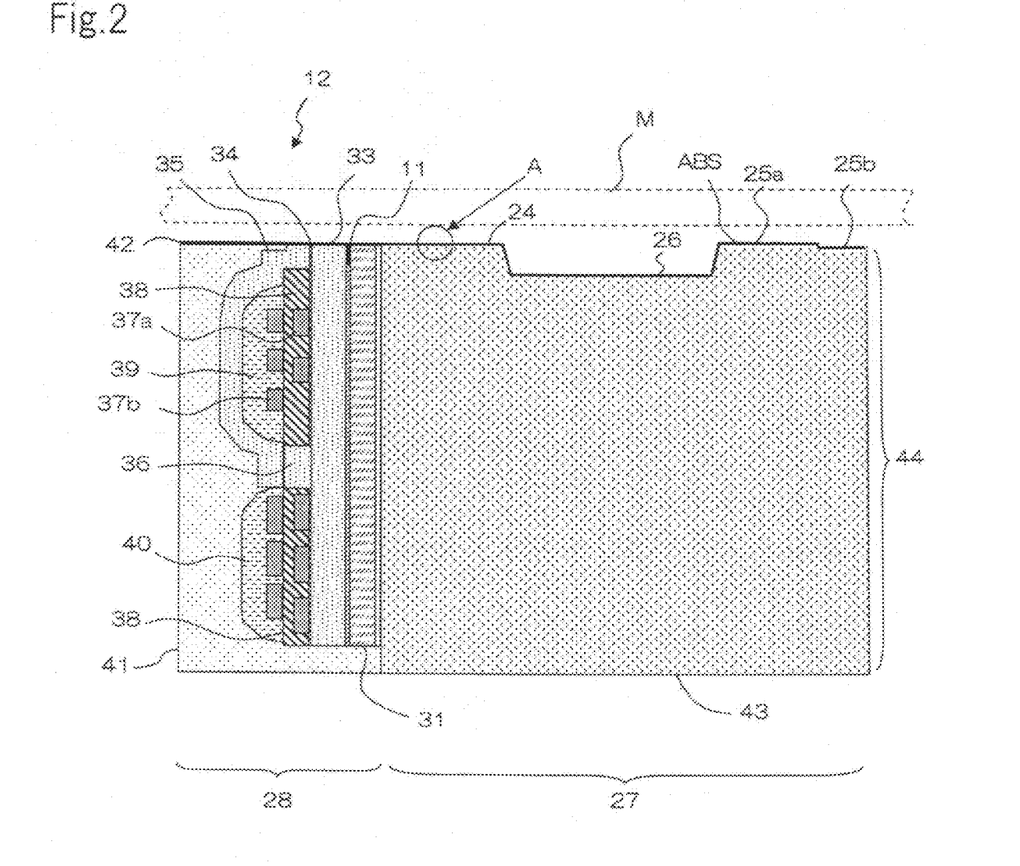
FIG. 2 is a sectional view of the slider shown in FIG. 1 taken along line 2-2 in FIG. 1.

FIG. 2 shows a sectional view of the slider shown in FIG. 1 taken along line 2-2 in FIG. 1. In FIG. 2, recording medium M extends in a direction perpendicular to the plane of the figure above air bearing surface ABS. Thin-film magnetic head 28 includes reproduction element 11 for reading a magnetic record from recording medium M and recording element 12, composed of an induction-type magnetic conversion element, for writing a magnetic record to recording medium M, but may also have only one of these elements. Recording element 12 may be either a horizontal recording type for recording in a direction within the plane of recording medium M or a perpendicular recording type for recording in a direction outside the plane of recording medium M.

Thin-film magnetic head 28 is constructed by sequentially depositing each layer on substrate 27 composed of a ceramic material, such as ALTiC ($Al_2O_3$/TiC), on the right side of the figure toward the left. Shield layer 31 composed of, for example, Permalloy (NiFe) is formed above substrate 27 (toward the left in the figure; this orientation continued hereinbelow) with an insulating layer interposed. Reproduction element 11 is provided facing air bearing surface ABS on shield layer 31. As reproduction element 11, an element can be used that employs a magnetic sensing film that exhibits magnetoresistance, such as an AMR (Anisotropic Magnetoresistance) element, a GMR (Giant Magnetoresistrance) element, or a TMR (magnetic tunnel effect) element. A pair of lead layers (not shown) is connected to reproduction element 11 for supplying a sense current.

Recording element 12 is formed above reproduction element 11. Recording element 12 is formed from, for example, lower magnetic pole layer 33, recording gap 34, upper magnetic pole layer 35, coils 37a and 37b, connection part 36, insulating layers 38, 39 and 40, and so on to be explained hereinbelow. A concrete explanation of these components is next presented.

Lower magnetic pole layer 33 composed of a magnetic material such as Permalloy or CoNiFe is first formed over reproduction element 11. Lower magnetic pole layer 33 combines the function of the lower magnetic pole layer of recording element 12 and the function of the upper shield layer of reproduction element 11.

Upper magnetic pole layer 35 is provided above lower magnetic pole layer 33 with recording gap 34 interposed for insulation. One example of the material of recording gap 34 is a non-magnetic metal material such as NiP. An example of the material used for upper magnetic pole layer 35 is a magnetic material such as Permalloy or CoNiFe. Lower magnetic pole layer 33 and upper magnetic pole layer 35 are connected by connection part 36, the entire configuration forming one U-shaped magnetic unit.

Two stages of stacked coils 37a and 37b composed of a conductive material such as copper are provided between upper magnetic pole layer 35 and lower magnetic pole layer 33. Coils 37a and 37b are provided and are coiled with connection unit 36 as a core, and supply magnetic flux to upper magnetic pole layer 35 and lower magnetic pole layer 33. Coil 37a is enclosed by insulating layer 38 and coil 37b is enclosed by insulating layers 39 and 40 and coils 37a and 37b are thus insulated from the surroundings. The two-stage stacked construction is only one example, and a single-stage stack or a multiple-layer stack of three or more stages are also possible. A lead layer (not shown) for receiving a current signal from the outside is connected to coil 37b. Finally, overcoat layer 41 is formed to cover upper magnetic pole layer 35 and the lead layer. An insulating material such as alumina is used as the material of overcoat layer 41.

Referring also to FIG. 1, of air bearing surface ABS, rail parts 25a project furthest toward the recording medium, and read/write unit 24 is recessed approximately 2-3 nm from rail parts 25a. The steps of rail parts 25a and 25b are not absolutely necessary. The difference in level between read/write unit 24 and recessed portion 26 is 1-5 μm. Reverse surface 43 with respect to air bearing surface ABS of slider 21 is the contact surface with the flexure (not shown) that supports slider 21. Air bearing surface ABS of slider 21 is covered by protective film 42 that is formed by the method that is to be described.

Figure 3:
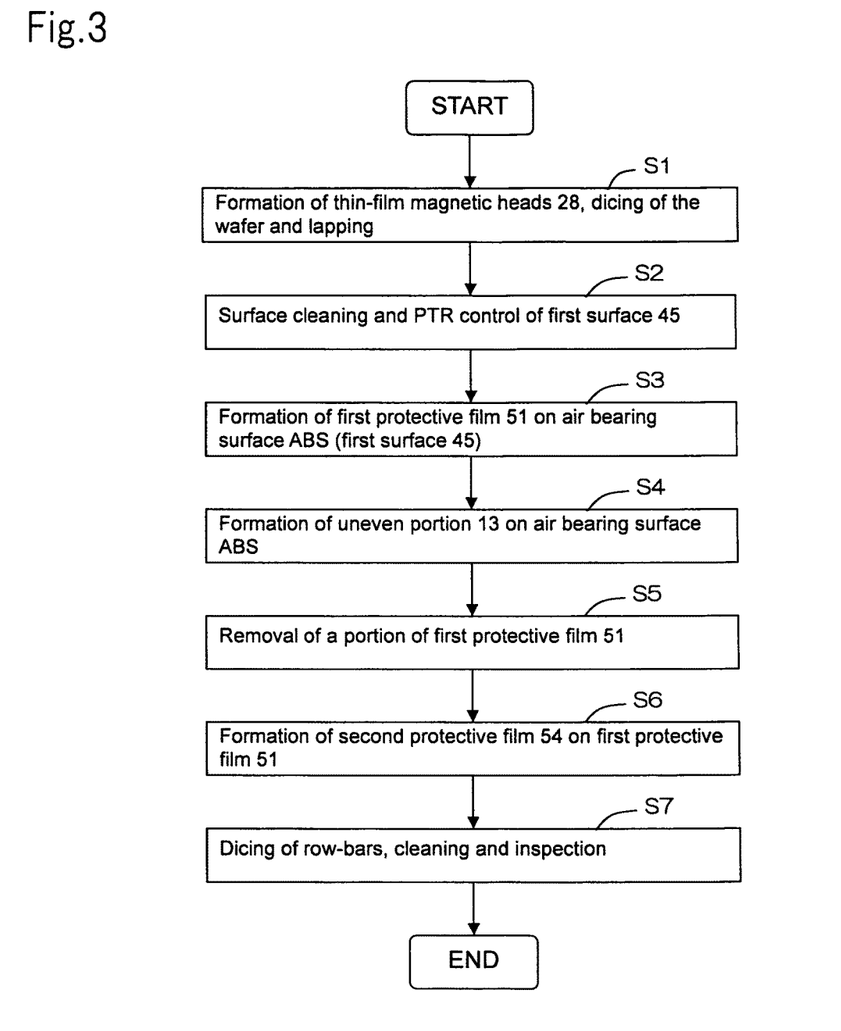
FIG. 3 is a flow chart showing the method of fabricating the slider of the present invention.
Figure 4A:
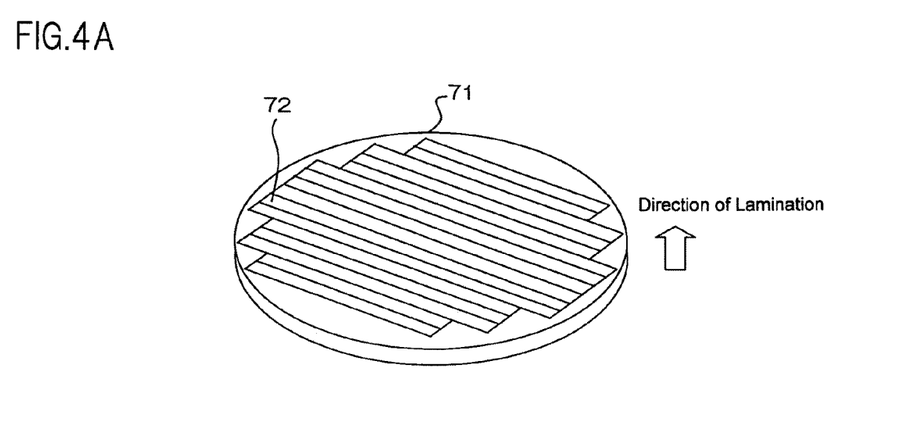
FIGS. 4A-4C are schematic views showing the wafer cutting method and the row-bar lapping method.
Figure 4B:
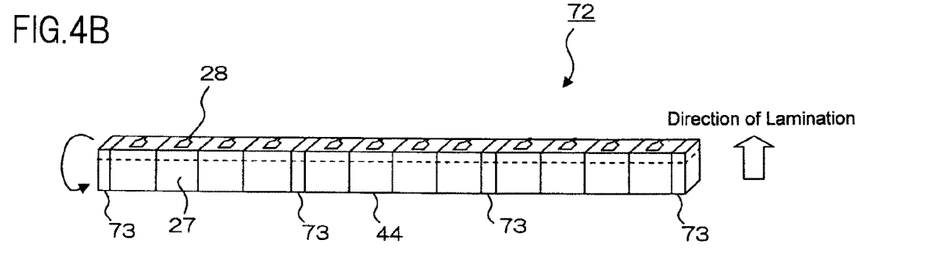

The method of fabricating the slider described hereinabove, and in particular, the method of forming protective film 42, is next explained using the flow chart of FIG. 3 and FIGS. 4 and 5.

Step S1: First, as shown in FIG. 4A, multiple thin-film magnetic heads 28 are deposited by means of thin-film processing on wafer 71 composed of ALTiC, and wafer 71 is then sliced into strip-like row-bars 72 in which head elements 44 are aligned in a row as shown in FIG. 4B. Wafer 71 may be cut into blocks of about 50 row-bars, and then cut into several blocks having a still smaller size for lapping. Wafer 71 and row-bars 72 that have been cut can be provided with one measurement element 73 for each group of a plurality of thin-film magnetic heads 28 in order to control the amount of lapping.

Figure 4C:
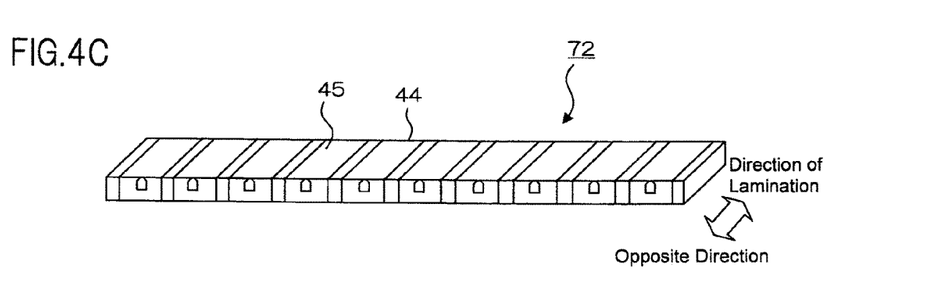
Figure 5A:
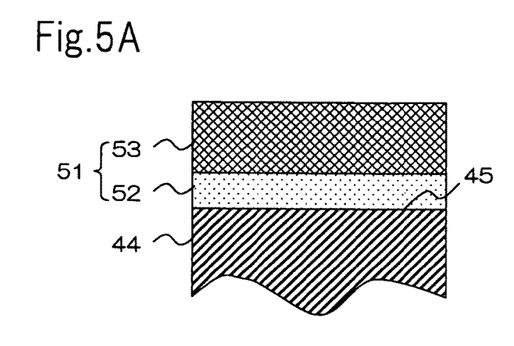
FIGS. 5A-5C are partial sectional view of the vicinity of the protective film of the slider.
Figure 5B:
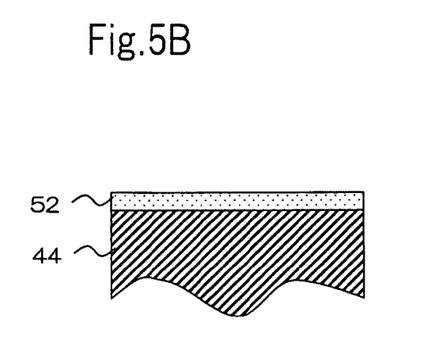
Figure 5C:
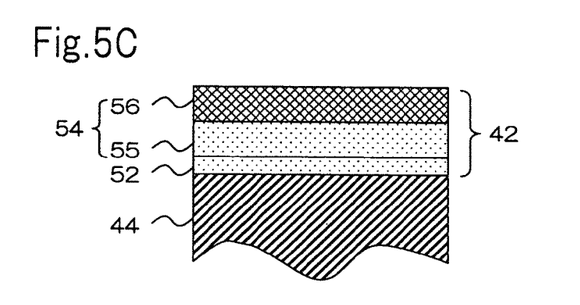

Next, as shown in FIG. 4C, the surface of head elements 44 that is to face the recording medium is lapped to form first surface 45 on air bearing surface ABS. This lapping is chiefly carried out to set the resistance value of reproduction element 11 to a desired value, but recording element 12 is also lapped at the same time and the height (length in the direction orthogonal to air bearing surface ABS) of recording gap 34 is adjusted to a desired value. Fine lapping is then preferably carried out to finish the surface. FIG. 4C is a perspective view in which FIG. 4B has been rotated 90° in the direction of the arrow in the figure.

Step S2: Surface cleaning and PTR (Pole Tip Recession) control of first surface 45 are next carried out by means of sputter etching or IBE (Ion Beam Etching). In the case of this sputter etching, glow plasma of argon is generated in a sputter chamber and the plasma cleaning of first surface 45 is carried out. In the case of IBE, an ion beam of argon is radiated upon first surface 45 and cleaning and PTR control are similarly carried out. The series of processes from this step until Step S6 are preferably carried out in one chamber without exposure to the air or carried out while being conveyed in a vacuum. When exposed to the atmosphere, oxidation or adhesion of contaminants occurs, thus preventing the proper growth of a film and giving rise to defects in the hard disk device.

Step S3: Step are here described with reference to FIGS. 5A-5C for forming a protective film on the air bearing surface. FIGS. 5A-5C are partial enlarged sectional views of the vicinity of the air bearing surface and show enlarged views of Section A of FIG. 2. FIGS. 5A-5C are shown in the order of the steps. In this step, first protective film 51 is formed on air bearing surface ABS (first surface 45) as shown in FIG. 5A. First protective film 51 is preferably composed of first silicon film 52 and first diamond-like carbon film 53 (hereinbelow referred to as "first DLC film 53"), these films being deposited on air bearing surface ABS in that order. First silicon film 52 is provided to ensure adhesion of first DLC film 53 to first surface 45 that is the base layer.

First silicon film 52 is normally grown by a sputtering method, but can also be grown by an IBD (Ion Beam Deposition) method or a CVD (Chemical Vapor Deposition) method. Methods such as the CVD method, IBD method, FCVA (Filtered Cathodic Vacuum Arc) method are used in growing first DLC film 53. The CVD method is a method of introducing high frequency such as ECR to generate plasma and then forming a film by decomposition of an organic gas. A bias may be applied to the substrate to form a film having a high degree of hardness. The gas is preferably an organic gas such as methane, ethane, propane, butane, ethylene, and acetylene in gas form and at a constant pressure. The FCVA method is a method of generating an arc discharge in a graphite rod to cause carbon to vaporize due to this heat and form a film by these ions. The ability to form a carbon film that does not contain hydrogen enables the formation of a thin film with a high degree of hardness.

Step S4: Uneven portion 13 is next formed on air bearing surface ABS of the slider on which first protective film 51 has been formed. As previously described, uneven portion 13 is made up from read/write unit 24, rail parts 25a and 25b, and recessed portion 26. To form uneven portion 13, a photoresist is first applied, exposed to light, and then developed to form a photoresist mask. Read/write unit 24, rail parts 25a and 25b, and recessed portion 26 are next formed by reactive ion etching or ion milling, and the photoresist is finally removed by, for example, brushing that employs a resist removal fluid. Reactive ion etching differs from ion milling in that, in addition to etching that uses plasma, etching is further carried out by means of a chemical reaction realized by a reactive gas.

Step S5: As shown in FIG. 5B, a method such as ion beam etching or ion milling is used to remove a portion of first protective film 51 from air bearing surface ABS of the slider on which uneven portion 13 has been formed. More specifically, all of first DLC film 53 is removed, and further, a portion of first silicon film 52 is removed to reduce the thickness of first silicon film 52. It is sufficient to carry out this step for at least thin-film magnetic head 28. In other words, it is also possible to apply a photoresist, expose the photoresist, and develop the photoresist in portions other than thin-film magnetic head 28 and remove only the portion of first protective film 51 of thin-film magnetic head 28. However, in the interest of limiting the number of steps, this step is preferably carried out for the entire surface of air bearing surface ABS. Ion beam etching and ion milling are forms of etching that employ plasma and are essentially identical processes. Acid dipping or sputter etching can also be used for the partial removal of first protective film 51.

Step S6: As shown in FIG. 5C, second protective film 54 is next formed on first protective film 51 (first silicon film 52) that has been reduced in thickness. Second protective film 54 is composed of second silicon (Si) film 55 and second diamond-like carbon film 56 (hereinbelow referred to as "second DLC film 56"), these films being deposited on first protective film 51. Second silicon film 55 and second DLC film can be formed by the same methods as first silicon film 52 and first DLC film 53, respectively. After second silicon film 55 has been deposited and before second DLC film 56 is deposited, a portion of second silicon film may be removed, thus making second silicon film 55 thinner. The portion of first silicon film 52, second silicon film 55 and second DLC film 56 that have been formed in this way make up previously-described protective film 42. As is clear from the explanation to this point, protective film 42 of this type of film formation is formed in a portion of air bearing surface ABS, and only second protective film 54 is formed in, for example, recessed portion 26 because first protective film 51 was completely removed.

Step S7: The subsequent dicing of row-bars, cleaning, and inspection are realized by the same processes as in the prior art to complete the slider.

Embodiment Modification: In the present invention, the above-described Step S4 can also be implemented after Step S6. In other words, after forming first protective film 51 that is composed of first silicon film 52 and first diamond-like carbon film 53 in accordance with Step S3, a portion of first protective film 51 can be removed in accordance with Step S5, second protective film 54 can then be formed in accordance with Step S6, following which uneven portion 13 can be formed on air bearing surface ABS of the slider in accordance with Step S4. Removing a portion of first protective film 51 brings about flattening of the surface of first protective film 51 (the surface of first silicon film 52) that remains. Second protective film 54 is then formed over this surface, whereby an improvement of the flatness of second protective film 54 is obtained. As a result, sufficient flatness of the surface of second protective film 54 can still be ensured despite the subsequent formation of uneven portion 13, even though the surface of second protective film 54 may be somewhat roughened.

WORKING EXAMPLES 1-5

Row-bars in which TMR heads are formed were prepared, and each TMR head was lapped until a desired resistance was obtained. Fine lapping was further carried out to ensure the degree of smoothness of the surface. In both the working examples and the comparative example, cleaning was implemented in an argon gas atmosphere by IBE in a cleaning device having an effective diameter of 350 mm φ and by applying a voltage of 300 V. The first silicon film was then formed by a sputtering method and the first DLC film was formed by means of an FCVA method using MR3 manufactured by the Shimadzu Corporation to form the first protective film. The floating surface (uneven portion) of the air bearing surface was next processed to form an uneven shape. Argon gas ions were then radiated with an applied voltage of 75 V to etch the first protective film. In the comparative example, all of the first protective film was removed by etching, while in the Working Examples, all of the first DLC film and a portion of the first silicon film were removed such that the value of the remaining thickness of the first silicon film following removal was as indicated in Table 1. The second protective film that is composed of second silicon film and second DLC film was then formed. The thickness of the silicon film that was finally formed was the sum of the remaining film thickness of the first silicon film and the film thickness of the second silicon film, this thickness being 1.0 nm in all of the Working Examples. The second DLC film was then formed by the same method as was used for forming the first DLC film. The thicknesses of the first and second protective films were calculated by ESCA (Electron Spectroscopy for Chemical Analysis).

The following two types of tests were then carried out as a test of the reliability of the heads. First, as a sulfuric acid corrosion test, a row-bar in which the protective film was formed was immersed in a sulfuric acid solution of pH 3.6 for four hours, then rinsed in water, following which the presence or absence of corrosion on the head was checked by a 200-power microscope to find the rate of occurrence of corrosion. In the sulfuric acid immersion test, pinholes in the film were examined. Next, as a pure water dipping test, a row-bar in which the protective film was formed was immersed in pure water at a temperature of at least 2.95° C. for four hours, then subjected to brush-cleaning, next subjected to heat stress, and the state of peeling of the protective film was then similarly observed by a 2000-power deep-ultraviolet microscope to check the rate of occurrence of peeling.

The numerical values of the columns of the corrosion test shown in the table show the rates of occurrence of corrosion and peeling, lower values indicating better results.

TABLE 1

| | Formation of the first protective film | | | Removal of the first silicon film | Formation of the second protective film | | | | | Corrosion test | |
|---|---|---|---|---|---|---|---|---|---|---|---|
| | | | | | Removing | | Final | | | | |
| Film | First silicon film (A) | First DLC film (B) | Total thickness (A + B) | Remaining thickness of the first silicon film (D) | Second silicon film (E) | thickness of the second silicon film (F) | thickness n of the silicon film (D + E − F = G) | Second DLC film (H) | Total thickness (G + H) | Sulfuric acid corrosion test | Pure water dipping test |
| Comparative Example | 1.0 | 2.0 | 3.0 | 0.0 | 1.0 | 0.0 | 1.0 | 1.6 | 2.6 | 40% | 30% |
| Working Example 1 | 1.0 | 2.0 | 3.0 | 0.2 | 0.8 | 0.0 | 1.0 | 1.6 | 2.6 | 10% | 6% |
| Working Example 2 | 1.0 | 2.0 | 3.0 | 0.4 | 0.6 | 0.0 | 1.0 | 1.6 | 2.6 | 10% | 6% |
| Working Example 3 | 1.0 | 2.0 | 3.0 | 0.6 | 0.4 | 0.0 | 1.0 | 1.6 | 2.6 | 16% | 7% |
| Working Example 4 | 1.0 | 2.0 | 3.0 | 0.8 | 0.2 | 0.0 | 1.0 | 1.6 | 2.5 | 17% | 8% |
| Working Example 6 | 1.0 | 2.0 | 3.0 | 1.0 | 0.0 | 0.0 | 1.0 | 1.6 | 2.6 | 23% | 10% |
| Working Example 6 | 1.0 | 2.0 | 3.0 | 0.2 | 1.0 | 0.2 | 1.0 | 1.6 | 2.6 | 8% | 2% |
| Working Example 7 | 1.0 | 2.0 | 3.0 | 0.2 | 1.0 | 0.6 | 0.7 | 1.4 | 1.6 | 8% | 2% |
| Working Example 8 | 1.0 | 2.0 | 3.0 | 0.2 | 1.0 | 0.7 | 0.6 | 1.2 | 1.2 | 9% | 6% |
| Working Example 9 | 1.0 | 2.0 | 3.0 | 0.4 | 0.6 | 0.0 | 1.0 | 1.6 | 2.6 | 16% | 7% |
| Working Example 10 | 1.0 | 2.0 | 3.0 | 0.4 | 0.6 | 0.0 | 1.0 | 1.0 | 2.0 | 22% | 8% |

As can be seen from the Table, the rates of occurrence of corrosion and peeling were higher in the comparative example, in which the first silicon film was completely removed, even though the final film composition of the protective film was absolutely identical to that of the Working Examples 1-5. The reasons for this result are unclear, but as one possible reason, it is believed that when the first silicon film is completely removed, direct damage reaches recording element 11 and reproduction element 12, causing degradation of the degree of smoothness of the surfaces of these elements 11 and 12 and thus promoting the occurrence of pinholes. In contrast, it is believed that elements 11 and 12 in Working Examples 1-5 were protected because the first silicon film remains to the end, whereby this phenomenon is prevented and a more reliable protective film can be formed. In addition, the rates of occurrence of corrosion and peeling in Working Examples 1-4, in which a portion of the first silicon film was removed, were lower than in Working Example 5, in which the first silicon film was not removed. It is believed that this result was obtained because the first silicon film was flattened in the process of thinning (removing) in Working Examples 1-4 and the degree of flatness of the second protective film that was formed over the resulting film was therefore improved.

WORKING EXAMPLES 6-8

In Working Examples 6-8, the first silicon film was removed to leave just 0.2 nm, as in the first Working Example, following which the second silicon film was formed to a film thickness of 1.0 nm and the second silicon film then etched until the final film thickness shown in Table 1 was obtained. In Working Example 6, for example, the first silicon film was removed until just 0.2 nm remained, following which the second silicon film was formed to a film thickness of 1.0 nm and then etched just 0.2 nm to achieve a final film thickness of 1.0 nm. An FCVA method was then used to form the second DLC film to a film thickness of 1.5 nm.

A comparison of Working Example 1 and Working Example 6 shows that superior results relating to corrosion resistance were obtained by Working Example 6. In the case of Working Example 6, the second silicon film that was once formed was subjected to etching and was therefore prone to damage due to this etching. However, it is believed that the preferential removal of protrusions during etching flattens the minute unevenness of the surface and improves the coverage of the second DLC film, and the latter effect is considered a more dominant factor.

WORKING EXAMPLES 9 and 10

Working Examples 9 and 10 correspond to the modification of the above-described embodiments, i.e., to the embodiment in which Step S4 (the step of forming the uneven portion) was implemented after Step S6 (the step of forming the second protective film). The film formation conditions and film removal conditions of Working Example 9 were identical to those of Working Example 2, and Working Example 10 differs from Working Example 9 only with regard to the film formation thickness of the second DLC film. The results for the corrosion tests were somewhat poorer than for Working Example 2 but superior to the comparative example. Because the formation steps of the uneven-portion were carried out after the formation steps of the second protective film, as previously described, a high possibility exists that slight damage remains on the second protective film, but an improvement in reliability that was achieved by the flattening effect was confirmed.

Although a certain preferred embodiments of the present invention have been shown and described in detail, it should be understood that various changes and modifications may be made without departing from the spirit or scope of the appended claims.

What is claimed is:

1. A method of fabricating a magnetic head slider, the method comprising:
    forming a first protective film on an air bearing surface of a magnetic head slider on which either a recording element or a reproduction element is formed or on which both a recording element and a reproduction element are formed;
    removing a portion of said first protective film to reduce a thickness of the first protective film and forming a second protective film over said first protective film that has been reduced in thickness; and
    forming an uneven portion for controlling flying characteristics of the magnetic head slider on said air bearing surface of said magnetic head slider;
    wherein the formation of said uneven portion is carried out after said first protective film has been formed and before said first protective film is reduced in thickness and before said second protective film is formed, or after said second protective film has been formed,
    wherein the forming of the first protective film includes depositing a first silicon film and a first diamond-like carbon film in that order on said air bearing surface, and
    wherein the removing of the portion of said first protective film includes removing all of said first diamond-like carbon film, and further removing a portion of said first silicon film to reduce a thickness of said first silicon film such that the thickness of said first silicon film is at largest 1nm, said portion of said first silicon film having been damaged during the formation of said uneven portion.

2. The method of fabricating a magnetic head slider as set forth in claim 1, wherein forming said second protective film includes depositing a second silicon film on the first silicon film that has been reduced in thickness, and further, depositing a second diamond-like carbon film.

3. The method of fabricating a magnetic head slider as set forth in claim 2, further comprising a step of removing a portion of said second silicon film to reduce a thickness of the second silicon film after depositing said second silicon film and before depositing the second diamond-like carbon film.

* * * * *